United States Patent [19]
Thurston et al.

[11] Patent Number: 5,499,893
[45] Date of Patent: Mar. 19, 1996

[54] FLEXIBLE LOCK NUT AND METHOD OF MANUFACTURING

[75] Inventors: Raymond L. Thurston, Medina; Steven H. Schulenburg, Twinsburg, both of Ohio

[73] Assignee: Illinois Tool Works Inc., Glenview, Ill.

[21] Appl. No.: 175,322

[22] Filed: Dec. 29, 1993

[51] Int. Cl.⁶ .......................... F16B 39/22; F16B 39/28
[52] U.S. Cl. ...................... 411/282; 411/282; 411/937.1; 470/19
[58] Field of Search ...................... 411/281, 282, 411/283, 284, 937.1; 470/19

[56] References Cited

U.S. PATENT DOCUMENTS

| | | | |
|---|---|---|---|
| 2,286,982 | 6/1942 | Todd | 411/282 |
| 2,452,192 | 10/1948 | Hosking. | |
| 2,754,871 | 7/1956 | Stoll | 411/283 |
| 3,441,073 | 4/1969 | Johnson. | |
| 3,456,704 | 7/1969 | Johnson | 411/284 |
| 3,459,249 | 8/1969 | Jordan et al. | 411/282 |
| 3,543,826 | 12/1970 | Forgaard | 411/284 |
| 3,678,978 | 7/1972 | Davis et al. | 411/282 |
| 3,702,628 | 11/1972 | Cosenza. | |
| 4,207,938 | 6/1980 | Mortus. | |
| 4,990,043 | 2/1991 | Hafeli et al. | 411/280 |
| 5,143,499 | 9/1992 | Bobo et al. | 411/247 |

Primary Examiner—Neill R. Wilson
Attorney, Agent, or Firm—Schwartz & Weinrieb

[57] ABSTRACT

A low profile lock nut for receiving a threaded bolt therein including a body portion having a threaded axial bore extending therethrough with first and second opposite ends, a crown member for providing a predetermined degree of flexibility, at least in a radial direction, to at least one of the first and second ends of the body portion and an engagement member on at least one portion of the bore positioned a predetermined distance from each of the first and second ends respectively for engaging the threads of the bolt without distorting the bolt threads and for cooperating with the crown member to provide a desired installation torque as well as a desired removal torque.

24 Claims, 1 Drawing Sheet

U.S. Patent     Mar. 19, 1996     5,499,893
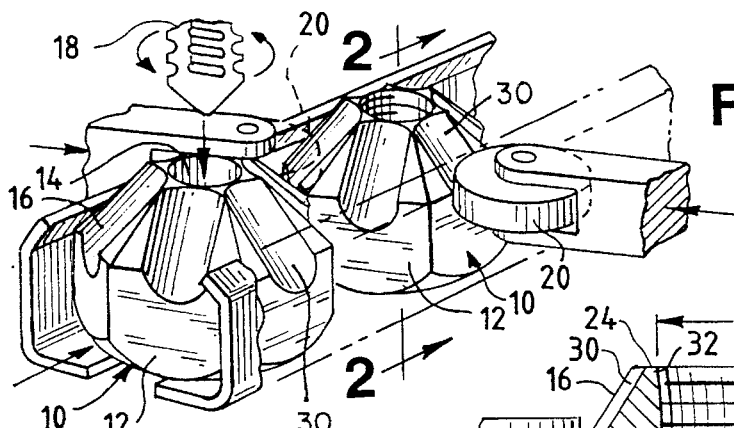
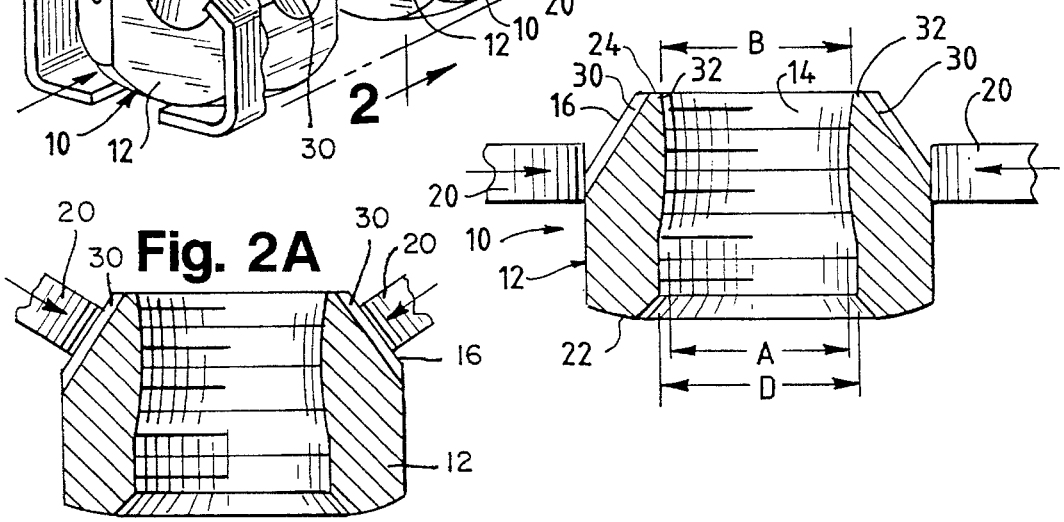
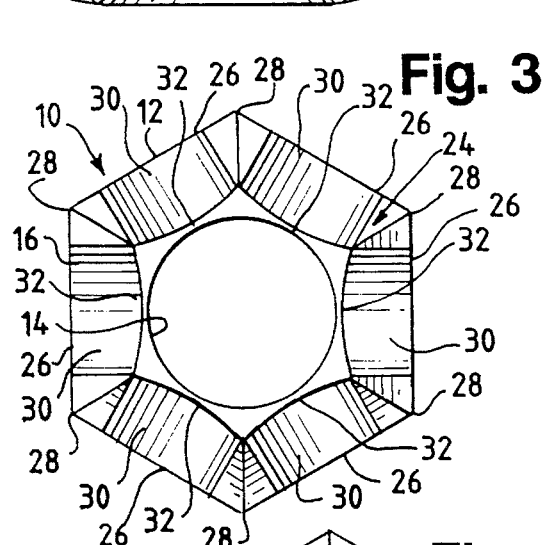
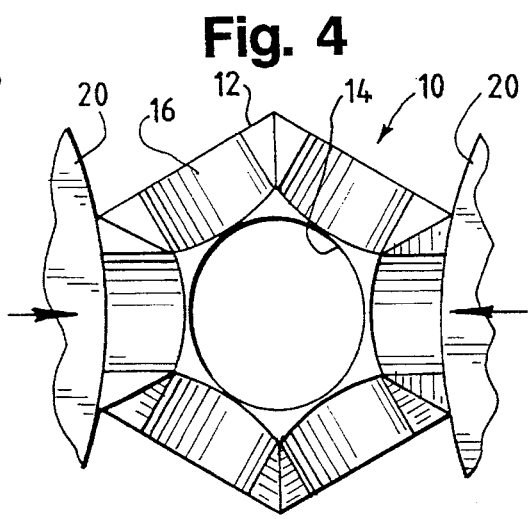
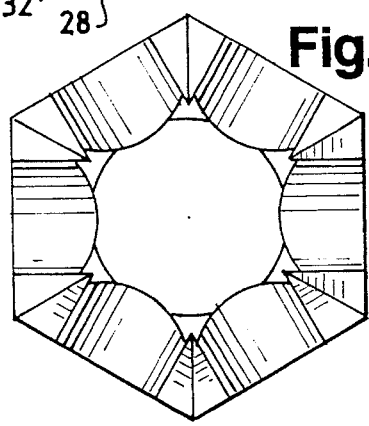
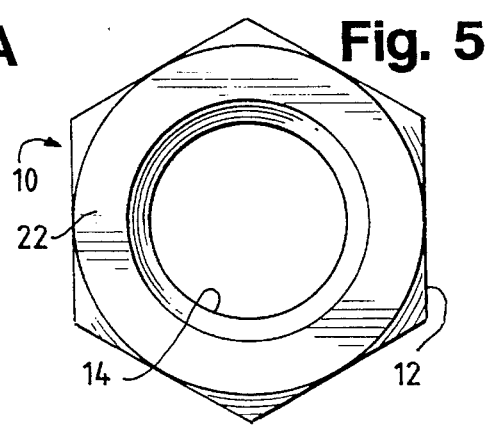

FLEXIBLE LOCK NUT AND METHOD OF MANUFACTURING

BACKGROUND OF THE INVENTION

1. Field of the Invention

This invention relates generally to lock nuts for use with threaded bolts, and more particularly, to a lock nut formed in one-piece with a relatively low profile which provides a relatively low installation torque yet a high removal torque, even after repeated cycles of installation and removal of the lock nut from the bolt.

2. Description of the Related Art

Lock nuts which resiliently deform upon being threaded onto a bolt are typically of a relatively high profile and include some type of deformation of the nut. An example of such a lock nut is disclosed in U.S. Pat. No. 4,990,043 which discloses a lock nut having a rigid body and a plurality of flexible locking beams projecting from one end of the rigid body. The locking beams are separated by slots so that upon engagement with a bolt the beams deflect outwardly and provide a resistance force to the bolt threads and reduce loosening of the lock nut as a result of vibrations.

That patent also discloses a sleeve integrally formed with one end of the rigid body of the nut where the threaded bore of the sleeve is deformed into a slightly oval configuration along the entire length of the bore. Such a lock nut, however, not only provides a substantially high profile which prevents its use in many applications, but is also substantially stiff since the bore is deformed along its entire length which inhibits installation and removal.

It therefore would be desirable to provide a one-piece low profile lock nut which provides a low installation torque yet a high removal torque, even after repeated installation and removal of the lock nut, where a portion of the lock nut is substantially flexible so as to provide a spring action and enable threaded engagement with the bolt while providing the desired low installation and high removal torques.

SUMMARY OF THE INVENTION

The invention provides a low profile lock nut formed in one-piece having a body portion including a threaded axial bore therethrough for engagement with the threads of a bolt. At least one end of the body portion is formed to include a crown portion having a predetermined, preferably scalloped, configuration which provides a desired degree of flexibility to the crown portion. The bore of the lock nut is reconfigured so as to provide axial and radial movement of threads at a predetermined position along its length at a distance from the ends of the bore to include a bolt thread engagement portion. The engagement portion engages the bolt threads without distorting them and cooperates with the flexible crown portion to enable outward expansion of the nut and provide a spring force to the bolt threads which provides the desired low installation and high removal torques.

After repeated cycles of installation and removal of the lock nut from the bolt, the installation and removal torques remain substantially constant. This is particularly important in applications where parts are routinely substituted or removed and reinstalled for cleaning or inspection.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a perspective view illustrating one way of tapping and deforming lock nuts according to the teachings of the present invention;

FIG. 2 is a longitudinal cross-sectional view of a lock nut of the invention taken along line 2—2 of FIG. 1 and in the direction indicated illustrating the different diameters of the threaded axial bore after deforming the lock nut;

FIG. 2A is a longitudinal cross-sectional view of another embodiment of the lock nut of the invention illustrating a hexagonal shaped threaded axial bore;

FIG. 3 is a top plan view of a lock nut of the invention before being deformed illustrating the substantially constant circular diameter of the axial bore;

FIG. 4 is a top plan view of the nut of FIG. 2 as it is being deformed illustrating the elliptical shape obtained by the axial bore;

FIG. 4A is a top plan view of the nut of the embodiment of FIG. 2A; and

FIG. 5 is a bottom plan view of the nut of FIG. 3 before being deformed.

DESCRIPTION OF THE PREFERRED EMBODIMENT

Referring to FIGS. 1 and 2, the lock nut of the invention is generally designated by the reference numeral 10. The lock nut 10 is preferably formed from metal, has a very low profile and substantially includes a body 12 having a threaded axial bore 14 and a crown portion 16 formed on one end of the body portion 12. It is to be noted, however, that the particular material and shape of the lock nut 10 can vary so long as it functions as described herein.

Preferably, to form the lock nut 10, the crown portion 16 is formed on one end of the body 12 in a cold forming operation or the like. As FIG. 1 illustrates, the threaded axial bore 14 is then provided by a tap 18. The lock nuts 10 are then conveyed for deformation, such as by compressing or crimping, which is preferably provided by rollers 20 in an in-line process which may leave slight indentations (not illustrated) on the exterior of the body 12. Compression of the lock nut 10 distorts a portion of the axial bore 14 into a slightly elliptical or oval shape as illustrated in FIGS. 2 and 4.

The preferred mode of compressing or crimping is accomplished by rollers 20 contacting the body 12 substantially perpendicularly to the axis of the nut. However, alternatively the crown portion can be contacted directly at two or more opposed sections of the crown resulting in the shape shown in FIGS. 2A and 4A.

Details of the axial bore 14, crown portion 16 and the cooperation of these elements will be provided herein. It is to be understood, however, that the method of manufacturing the lock nut 10 can vary.

Briefly, in use, the shape of the crown portion 16 provides a predetermined degree of flexibility to one end of the body 12 which typically does not face a threaded bolt (not illustrated) during installation or use. Upon engagement of the end of the axial bore 14 opposite the crown portion 16 with the threaded bolt, the bolt threads initially engage the first few threads of the bore 14 which are substantially circular in shape. Upon continued advancement of the lock nut 10 on the bolt, the bolt threads engage the compressed elliptical portion of the axial bore 14. Due to the flexibility of the crown portion 16, the axial bore 14 expands to its original circular shape upon continued advancement of the lock nut 10. Thus, the crown portion 16 functions similar to a spring member and applies an initial low installation torque yet a high retention torque or resisting force to the bolt threads without causing deformation of the bolt threads.

As FIG. 2 illustrates, the body portion 12 includes a first bolt entrance end 22 and a second opposite bolt exit end 24. The axial bore 14 is threaded and extends between the first and second ends 22 and 24.

As FIG. 3 illustrates, to enable gripping of the lock nut 10 with a tool, such as a wrench, the external periphery of the body portion 12 is preferably formed to include a plurality of wrench flats 26. Preferably, six wrench flats 26 are provided having six corresponding hex points 28, one hex point 28 between each wrench flat 26. Initially, before forming the crown portion 16 on the body 12, the wrench flats 26 and hex points 28 preferably extend along the entire length of the body portion 12 from the first end 22 to the second end 24.

As FIGS. 2 and 3 illustrate, the crown portion 16 is illustrated positioned on the second end 24 of the body 12, but can be positioned on the first end 22, or both, if desired. The crown portion 16 is preferably provided as a continuous member about the periphery of the lock nut 10 and includes a plurality of concave or conical indentations 30 formed thereon which provide the crown portion 16 with a "scalloped" shape about its external periphery and the desired degree of flexibility to the crown portion 16.

Preferably, six concave indentations 30 are provided, one each to correspond in radial position with a respective wrench flat 26. The concave indentations 30 taper toward the second end 24 so as to form the conical shape and include a substantially thin wall portion 32 positioned proximate a midpoint of each concave indentation at the second end 24 of the body 12.

To vary the flexibility of the crown portion 16, the material, configuration and dimensions of the lock nut 10 can vary so long at it functions as described.

As FIG. 2 illustrates, after compression or crimping of the lock nut 10 by the rollers 20, the axial bore 14 obtains its greatest elliptical shape proximate the impact point with the rollers 20 having a minor axis indicated by "A". Due to the flexibility of the crown portion 16, the bore 14 is also slightly elliptical as it passes through the crown portion 16 having a minor axis indicated by "B".

As the bore 14 passes through the first end 22 of the body 12, however, it substantially maintains its original circular configuration due to the thickness of the first end 22 of the body 12 and has a diameter indicated by "D". The circular diameter "D" enables easy starting of the lock nut 10 on the bolt.

Preferably, the minor axis "A" is positioned proximate the midpoint of the bore 14 which roughly corresponds to the interface between a bottom of the crown portion 16 and the remainder of the body 12, but can vary so long as it is positioned away from the ends of the bore 14. The minor axis "A" is smaller than the minor axis "B" proximate the end of the bore 14 at the second end 24 of the body 12. Additionally, the diameter "D" of the bore 14 proximate the first end 22 of the body 12 is greater than the minor axis "B". Thus, the bore 14 is initially circular with a diameter "D" proximate the first end 22 of the body 12, becomes elliptical toward its center with a minor axis "A" and expands back outwardly to an elliptical shape with a minor axis "B" which is greater than the minor axis "A".

It is to be noted that the resistance force provided by the crown portion 16 which provides the low installation and high removal torque remains substantially constant, even after repeated cycles of installation and removal of the lock nut 10 from the bolt. The following tables illustrate torques obtained in testing with the lock nut 10.

TABLE I

| | GROUP I | | |
|---|---|---|---|
| SAMPLE No. | FIRST-ON (In/Lbs) | FIRST-OFF (In/Lbs) | FIFTH-OFF (In/Lbs) |
| 1 | 38 | 35 | 30 |
| 2 | 50 | 42 | 38 |
| 3 | 43 | 38 | 30 |
| 4 | 40 | 38 | 32 |
| 5 | 50 | 48 | 35 |
| HIGH | 50 | 48 | 38 |
| LOW | 38 | 35 | 30 |
| AVG. | 44.2 | 40.2 | 33 |

TABLE II

| | GROUP II | | |
|---|---|---|---|
| SAMPLE No. | FIRST-ON (In/Lbs) | FIRST-OFF (In/Lbs) | FIFTH-OFF (In/Lbs) |
| 1 | 60 | 50 | 40 |
| 2 | 38 | 30 | 28 |
| 3 | 30 | 28 | 20 |
| 4 | 50 | 40 | 30 |
| 5 | 30 | 20 | 20 |
| HIGH | 60 | 50 | 40 |
| LOW | 30 | 28 | 20 |
| AVG. | 41.6 | 35.2 | 27.6 |

The above test results were obtained using an In/Lb hand torque wrench. In each case, the initial "First-On" torque was taken after three full bolt threads were exposed. The "First-Off" torque was obtained with one complete turn counterclockwise. The "Fifth-Off" torque was obtained after five cycles of installing and removing with the reading taken with the fifth removal.

Modifications and variations of the present invention are possible in light of the above teachings. It therefore is to be understood that the invention may be practiced other than specifically described above.

What is claimed and desired to be secured by letters patent is:

1. A low profile lock nut for receiving a threaded bolt, comprising:

a body portion having a threaded axial bore extending therethrough, and wherein said body portion and said threaded axial bore have first and second opposite axial ends;

engagement means disposed upon at least one portion of said axial bore and positioned a predetermined distance from each one of said first and second opposite axial ends for lockingly engaging the threads of the bolt upon installation of said bolt within said axial bore without distorting said bolt threads; and crown means formed upon one of said first and second opposite axial ends of said body portion and comprising thinned portions which extend from said one of said first and second opposite axial ends to an axial position which substantially corresponds to the axial disposition of said engagement means so as to provide said body portion with a predetermined degree of flexibility along the axial extent between said engagement means and said one of said first and second opposite axial ends and in a radial direction with respect to said axial bore such that upon engagement of said engagement means by said bolt when said bolt is threadedly inserted within said threaded axial bore, said thinned portions of said crown means will permit flexure of said body portion defined between said engagement means and said one of said first and second opposite axial ends of said body portion so as to provide said lock nut with a relatively low installation torque and a relatively high removal torque.

2. The lock nut as defined in claim 1 wherein said crown means include a continuous periphery and a predetermined configuration to provide said degree of flexibility.

3. The lock nut as defined in claim 1 wherein said crown means and said engagement means provide for maintaining at least one of said installation and removal torques substantially constant after repeated installation and removal of the lock nut from the bolt.

4. The lock nut as defined in claim 1, wherein:

an exterior periphery of said body portion includes a plurality of wrench flats circumferentially positioned thereabout; and said crown means are integrally formed upon said at least one of said first and second axial ends of said body portion and said thinned portions include a plurality of concave surfaces which correspond in number to said wrench flats, each concave surface being circumferentially positioned so as to substantially correspond with a respective wrench flat and being tapered toward the end of said body portion on which said concave surface is formed so that a thin region is formed along each concave surface, proximate its midpoint, and the respective end of said body portion so as to provide said predetermined degree of flexibility.

5. The lock nut as set forth in claim 4, wherein:

said plurality of wrench flats and said plurality of concave surfaces comprises six wrench flats and six concave surfaces, respectively.

6. The lock nut as defined in claim 4 wherein said crown means provide a substantially continuous periphery.

7. The lock nut as defined in claim 1 wherein said engagement means include a portion of said bore with a substantially elliptical configuration.

8. A lock nut as set forth in claim 7, wherein:

the other one of said first and second opposite axial ends of said axial bore has a substantially circular configuration and a predetermined diametrical extent; and said engagement means comprises a radially compressed portion of said bore which has said substantially elliptical configuration with a predetermined diametrical extent, along a minor axis thereof, which is less than said predetermined diametrical extent of said axial bore at said other one of said first and second opposite axial ends.

9. A low profile lock nut for receiving a threaded bolt, comprising:

a body portion having a threaded axial bore extending therethrough, and wherein said body portion and said threaded axial bore have first and second opposite axial ends;

engagement means disposed upon at least one portion of said axial bore and positioned a predetermined distance from each one of said first and second opposite axial ends for lockingly engaging the threads of the bolt upon installation of said bolt within said axial bore without distorting said bolt threads; and crown means formed upon one of said first and second opposite axial ends of said body portion and comprising a plurality of concave surfaces defining thinned portions which are circumferentially spaced about said one of said first and second opposite axial ends of said body portion and which extend from said one of said first and second opposite axial ends of said body portion to an axial position which substantially corresponds to the axial disposition of said engagement means so as to provide said body portion with a predetermined degree of flexibility along the axial extent between said engagement means and said one of said first and second opposite axial ends of said body portion and in a radial direction with respect to said axial bore such that upon engagement of said engagement means by said bolt when said bolt is threadedly inserted within said threaded axial bore, said thinned portions of said crown means will permit flexure of said body portion defined between said engagement means and said one of said first and second opposite axial ends of said body portion so as to provide said lock nut with a relatively low installation torque and a relatively high removal torque.

10. The lock nut as set forth in claim 9, wherein:

the exterior periphery of said body portion comprises a plurality of wrench flats circumferentially disposed thereabout in a serial array; and said plurality of concave surfaces of said crown means corresponds in number to said plurality of wrench flats and are respectively circumferentially aligned with said plurality of wrench flats.

11. The lock nut as set forth in claim 10, wherein:

said plurality of wrench flats and said plurality of concave surfaces comprises six wrench flats and six concave surfaces, respectively.

12. The lock nut as set forth in claim 11, wherein:

said body portion of said lock nut, within an axial plane which comprises said wrench flats, has a substantially hexagonal configuration.

13. The lock nut as set forth in claim 5, wherein:

said body portion of said lock nut, within an axial plane which comprises said wrench flats, has a substantially hexagonal configuration.

14. A method of making a low profile lock nut, comprising the steps of:

providing a body portion having an axial bore defined therethrough, and wherein said body portion and said axial bore have first and second opposite ends;

forming a crown portion upon at least one of said first and second opposite ends of said body portion with said bore extending axially through said crown portion;

providing threads within said axial bore such that said threads extend between said first and second opposite ends of said body portion;

deforming at least one portion of said bore at a predetermined axial distance from each one of said first and second opposite ends of said body portion so that said deformed portion of said axial bore can engage the threads of said bolt upon installation of said bolt within said axial bore without distorting said bolt threads; and providing said crown portion with thinned regions which extend from said one of said first and second opposite axial ends of said body portion to an axial position which substantially corresponds to the axial disposition of said deformed portion of said axial bore so as to provide said body portion with a predetermined degree of flexibility along the axial extent between said deformed portion of said axial bore and said one of said first and second opposite axial ends of said body portion and in a radial direction with respect to said axial bore such that upon engagement of said deformed portion of said axial bore by said bolt when said bolt is threadedly inserted within said threaded axial bore, said thinned regions of said crown portion will permit flexure of said body portion defined between said deformed portion of said axial bore and said one of said first and second opposite axial ends of said body portion so as to provide said lock nut with a relatively low installation torque and a relatively high removal torque.

15. The method as set forth in claim 14, further comprising the step of:

providing the exterior periphery of said body portion with a plurality of wrench flats circumferentially disposed thereabout in a serial array such that said number of wrench flats corresponds in number to said plurality of thinned regions of said crown portion which are also circumferentially disposed about said exterior periphery of said body portion in a serial array.

16. The method as set forth in claim 15, wherein:

said number of said wrench flats, and said thinned regions of said crown portion, is six such that said body portion of said lock nut, within an axial plane which comprises said wrench flats, has a substantially hexagonal configuration.

17. The method as defined in claim 14, including the step of providing said crown portion with a continuous periphery and a predetermined configuration so as to provide said degree of flexibility.

18. The method as defined in claim 14 wherein said step of deforming includes compressing at least one portion of the periphery of said body portion so that said at least one portion of said bore has a substantially elliptical configuration.

19. The method as set forth in claim 18, wherein:

the other one of said first and second opposite axial ends of said axial bore has a substantially circular configuration and a predetermined diametrical extent; and said deformed, compressed portion of said bore having said substantially elliptical configuration has a predetermined diametrical extent, along a minor axis thereof, which is less than said predetermined diametrical extent of said axial bore at said other one of said first and second opposite axial ends.

20. A method of making a low profile lock nut, comprising the steps of:

providing a body portion with an axial bore which extends therethrough, wherein said body portion and said axial bore have first and second opposite ends;

forming a crown portion upon at least one of said first and second opposite axial ends of said body portion with said axial bore extending axially through said crown portion;

providing threads within said axial bore such that said threads extend between said first and second opposite axial ends of said body portion;

deforming at least one portion of said axial bore at a predetermined axial distance from each one of said first and second opposite ends of said body portion so that said deformed portion of said axial bore can engage the threads of said bolt upon installation of said bolt within said axial bore without distoring said bolt threads; and providing said crown portion with a plurality of concave surfaces defining thinned portions which are circumferentially spaced about said one of said first and second opposite axial ends of said body portion and which extend from said one of said first and second opposite axial ends of said body portion to an axial position which substantially corresponds to the axial disposition of said deformed portion of said axial bore so as to provide said body portion with a predetermined degree of flexibility along the axial extent between said deformed portion of said axial bore and said one of said first and second opposite axial ends of said body portion and in a radial direction with respect to said axial bore such that upon engagement of said deformed portion of said axial bore by said bolt when said bolt is threadedly inserted within said threaded axial bore, said thinned regions of said crown portion will permit flexure of said body portion defined between said deformed portion of said axial bore and said one of said first and second opposite axial ends of said body portion so as to provide said lock nut with a relatively low installation torque and a relatively high removal torque.

21. The method as set forth in claim 20, wherein:

said step of deforming said at least one portion of said axial bore comprises radially compressing at least one peripheral region of said body portion such that said one portion of said axial bore has a substantially elliptical configuration.

22. The method as set forth in claim 21, wherein:

the other one of said first and second opposite axial ends of said axial bore has a substantially circular configuration and a predetermined diametrical extent; and said deformed, radially compressed portion of said bore having said substantially elliptical configuration has a predetermined diametrical extent, along a minor axis thereof, which is less than said predetermined diametrical extent of said axial bore at said other one of said first and second opposite axial ends.

23. The method as set forth in claim 20, further comprising the step of:

providing the exterior periphery of said body portion with a plurality of wrench flats circumferentially disposed thereabout in a serial array such that said number of wrench flats corresponds in number to said plurality of concave surfaces of said crown portion which are also circumferentially disposed about said exterior periphery of said body portion in a serial array.

24. The method as set forth in claim 23, wherein:

said number of said wrench flats, and said concave surfaces of said crown portion, is six such that said body portion of said lock nut, within an axial plane which comprises said wrench flats, has a substantially hexagonal configuration.

* * * * *